United States Patent [19]

Chow et al.

[11] 4,406,722

[45] Sep. 27, 1983

[54] DIFFUSION BONDING OF DISSIMILAR CERAMICS

[75] Inventors: William W. Chow; Eugene B. Rigby, both of Tucson, Ariz.

[73] Assignee: International Business Machines Corp., Armonk, N.Y.

[21] Appl. No.: 373,926

[22] Filed: May 3, 1982

[51] Int. Cl.³ .................. C03B 29/00; C04B 37/00
[52] U.S. Cl. ............................. 156/89; 29/603; 360/126
[58] Field of Search ................. 156/89; 29/603; 360/126

[56] References Cited

U.S. PATENT DOCUMENTS

| 3,311,522 | 3/1967 | Ladd et al. | 156/89 |
| 3,639,701 | 2/1972 | Secrist et al. | 29/603 |
| 3,672,045 | 6/1972 | Robertson | 29/603 |
| 3,772,471 | 11/1973 | Imai et al. | 29/603 |
| 4,276,331 | 6/1981 | Bothwell | 156/89 |

OTHER PUBLICATIONS

IBM Technical Disclosure Bulletin, vol. 21, No. 11, Apr. 1979, p. 4373.

Primary Examiner—Caleb Weston
Attorney, Agent, or Firm—J. A. Pershon; H. F. Somermeyer

[57] ABSTRACT

Diffusion bonding of dissimilar ceramics can be accomplished by the application of pressure only while the ceramics are at a temperature at which their expansion rates are the same. A process for manufacturing magnetic head cores is disclosed where a magnetic ferrite is diffusion bonded to a non-magnetic ceramic by heating the core pieces to the expansion rate crossover temperature and then applying the diffusion bonding pressure. The pressure is removed either before or after the bonded pieces are cooled.

12 Claims, 7 Drawing Figures

DIFFUSION BONDING OF DISSIMILAR CERAMICS

FIELD OF THE INVENTION

This invention relates generally to a method for diffusion bonding dissimilar ceramic components and, in particular, to an improved method for diffusion bonding magnetic ceramics to non-magnetic ceramics for use in the manufacture of magnetic heads.

BACKGROUND OF THE INVENTION

In the manufacture of magnetic heads, for instance, it is often necessary to bond two or more pieces of ceramic material together. Magnetic ferrite, for instance, is a common core material for magnetic heads. The magnetic ferrite is bonded to supporting pieces of a non-magnetic ceramic so that the surface of the magnetic head interfacing with the magnetic media is formed from a ceramic material. The ceramic material generally provides a long lasting surface against any abrasion that may occur with contact to the magnetic media.

Diffusion bonding has not found wide usage in the interconnection of dissimilar ceramics because prior to this invention the expansion co-efficience of the dissimilar ceramics must match exactly. Glass is generally used as a bonding material for connecting dissimilar ceramics because the glass bond can accommodate a slight difference in the expansion co-efficient of the ceramics and glass bonding operates at lower temperatures. The diffusion bonding, however, is preferred since the glass bond line essentially produces a flaw at the edge surface of the bonded ceramics. This is especially true for magnetic heads where the magnetic heads must, at times, have some contact with a magnetic media. The glass bond line wears faster than the ceramic materials which can then cause the ceramic materials to chip at the bond line.

DESCRIPTION OF THE PRIOR ART

In known bonding of ceramics, including diffusion bonding, a layer of glass or powder can be used between the blocks of ceramics to effect the bond. The U.S. Pat. No. 3,639,701, issued to D. R. Secrist, et al., and entitled "Magnetic Recording Head Having A Nonmagnetic Ferrite Gap", discloses a magnetic head assembly where a glass is sputter-deposited on mating ferrite ceramic surfaces. A pair of magnetic ferrites have a transducing gap formed of a non-magnetic crystalline ceramic formed on mating surfaces of the magnetic ferrites. The crystalline ceramic is formed as a bond between the mating surfaces. The bond is formed by solid-state diffusion bonding.

It is, therefore, an object of the present invention to provide a method of bonding dissimilar ceramic components using diffusion bonding without the addition of a sputter-deposited crystalline ceramic at the bond line.

The bonding of metals to ceramics and of similar ceramics using diffusion bonding is also known, as shown in U.S. Pat. No. 3,672,045, issued to D. D. Robertson, and entitled "Process For Bonding Magnetic Heads". In this patent, the transducing gap is formed from a non-magnetic metal by sputtering onto magnetic ferrite pole pieces. The transducing gap is, therefore, formed by diffusion bonding the non-magnetic metals with the magnetic ferrite ceramic material at the transducing gap, and a bond line is formed at the back gap of the magnetic head between the similar magnetic ferrite materials forming the pole pieces.

Another object of the present invention, therefore, is to provide a method of diffusion bonding dissimilar ceramic components.

In the IBM Technical Disclosure Bulletin, Vol. 19, No. 2, July 1976, at page 397, an article entitled "Magnetic Head Construction" discloses a magnetic head structure that utilizes a combination of glassing and diffusion bonding techniques. A magnetic ceramic is joined by diffusion bonding to a non-magnetic ceramic. No further information as to the characteristics of the ceramics or the factors involved in the diffusion bonding is given. In the IBM Technical Disclosure Bulletin, Vol. 20, No. 10, March 1978, at page 4088, an article entitled "Diffusion Bonding of Dissimilar Ceramics" discloses that the diffusion bonding process is dependent upon surface finish and flatness, temperature, time and pressure. The diffusion bond in this article required no bonding material, whether a glass, sputtered ceramic or metal. The correct bond is where a grain boundary diffusion takes place with the temperature being the factor that affects the bond to the greatest extent.

It is, therefore, a further object of the present invention to provide a method of diffusion bonding dissimilar ceramic components having dissimilar expansion co-efficients.

SUMMARY OF THE INVENTION

In accordance with the present invention, a process for diffusion bonding dissimilar ceramic components includes the steps of obtaining dissimilar ceramic pieces and then placing the ceramic pieces adjacent each other in the position for bonding the ceramic pieces together. The ceramic pieces are then heated to a certain temperature range which is the temperature where the dissimilar expansion rates of the ceramics are the same, that is, at a crossover point of their expansion rates. Pressure is then applied to the ceramic pieces to effect a diffusion bond while the temperature of the ceramic pieces is maintained at the certain temperature. The pressure is then removed from the bonded pieces either before or after the ceramic pieces are allowed to cool to ambient temperature.

It is, therefore, a primary object of the present invention to provide an enhanced process for diffusion bonding dissimilar ceramic pieces.

According to a particular feature of the present invention, a method is provided for diffusion bonding a magnetic ferrite ceramic component to a non-magnetic ceramic component to form a part of a magnetic head structure. A block of magnetic ferrite ceramic is formed as part of a magnetic head structure. A non-magnetic block is formed for bonding to the magnetic ferrite ceramic block. The dissimilar ceramic block pieces are placed adjacent each other in position for bonding at the adjacent faces. The block pieces are then heated to a certain temperature range which is the temperature where the dissimilar expansion rates of the magnetic and non-magnetic ceramics are the same, that is, at a crossover point of their expansion rates. Pressure is then applied to the heated pieces to effect a diffusion bond between the block pieces. The applied pressure is then removed after the bond is completed and the block pieces are cooled to an ambient temperature. The bonded block pieces are then assembled with other components to form a magnetic head structure.

It is, therefore, yet another object of the present invention to provide an enhanced process for making a magnetic head structure using a diffusion bonding process at a certain temperature to bond a non-magnetic ceramic block to a magnetic ferrite block.

Still another object of the present invention is to provide a process for enhancing the diffusion bonding of dissimilar ceramic components by applying a pressure to the components after the components have reached a certain temperature to affect a bond.

Yet another object of the present invention is to provide a process for diffusion bonding dissimilar ceramic components that have different thermal expansion rates without cracking.

These and other objects of the present invention will become apparent to those skilled in the art as the description proceeds.

BRIEF DESCRIPTION OF THE DRAWING

The various novel features of this invention, along with the foregoing and other objects, as well as the invention itself, both as to its organization and method of operation, may be fully understood from the following description of illustrated embodiments when read in conjunction with the accompanying drawing, wherein.

DESCRIPTION OF THE PREFERRED EMBODIMENTS

It has been observed that certain ceramic materials will bond with other ceramic materials at one temperature without cracking, yet if bonded at other temperatures, either the first or the second ceramic will crack. It is known that the expansion co-efficients for ceramics is not constant over a temperature interval. For instance with magnetic ferrites, as the temperature increases the expansion rate tends to decrease. On the other hand, most non-magnetic ceramics show a constant expansion co-efficient with temperature, or tends to increase at higher temperatures. What we have found is that if the expansion co-efficients for the dissimilar ceramics to be bonded together, for instance a magnetic ferrite to a non-magnetic ceramic, a certain temperature can be designated where their respective expansion curves intersect. If bonding is achieved at this certain temperature of curve crossover, the bonded pieces are found to be free of stress when cooled to ambient temperature. If the bond is effected either below or above this certain temperature, the ceramic that is placed under tension is observed to crack. For instance, since magnetic ferrites generally have a higher percentage of linear expansion below the certain temperature at the crossover of the curves and the ceramics have a lower percentage of linear expansion, if the bond is made below the certain temperature point the ferrite cracks because, upon cooling, the ferrite is placed in tension upon a return to ambient as compared to the non-magnetic ceramic. Above the certain temperature point, the opposite is generally the case. Above the certain temperature point, the non-magnetic ceramic has a higher linear expansion percentage and the magnetic ferrite generally has a lower linear expansion percentage. It has been found that if the bond is made above the certain temperature range, the non-magnetic ceramic cracks when bonded to a magnetic ferrite. The process according to the present invention according to this discovery is shown in FIG. 1.

Figure 1:
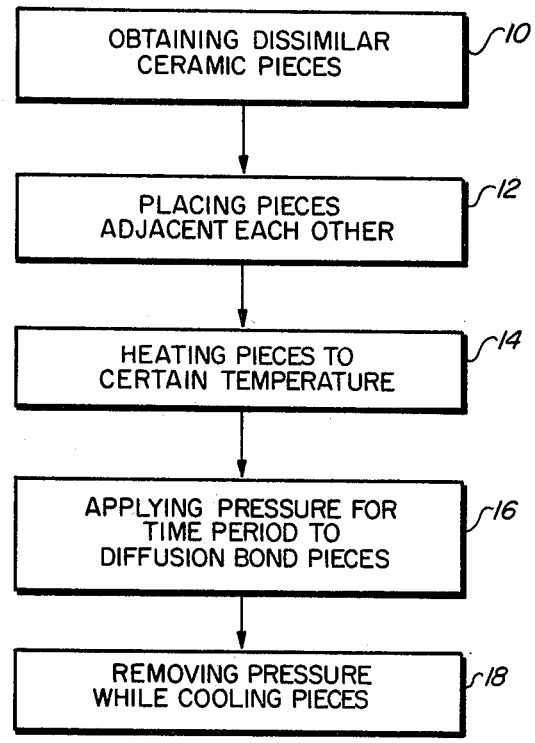
FIG. 1 is a flow chart of the processing steps for performing the diffusion bonding according to the present invention.

In FIG. 1, the process according to the preferred embodiment has as a first step 10 obtaining the dissimilar ceramic pieces that are to be bonded together. As will be discussed more fully later, the preferred embodiment is directed to a process for fabricating magnetic cores for a magnetic head and therefore the dissimilar ceramic pieces are a magnetic ferrite being bonded to a non-magnetic ceramic. The next step in the process shown in block 12 is to place the ceramic pieces adjacent each other for the eventual diffusion bond step. The next step as shown in block 14 is to heat the pieces to a certain temperature range. This certain temperature range, as will be shown in the later figures, is the temperature at which the respective expansion curves of the linear expansion percentage versus temperature of the respective materials intersect. The expansion curves are generally different for different ceramics.

When the dissimilar ceramic pieces have been heated to the certain temperature range as shown in the process step of block 14, a diffusion bonding pressure is first applied to diffusion bond the pieces together. This step is shown in block 16 and is critical to the invention in that only sufficient pressure to hold the pieces to be bonded adjacent each other should be applied prior to the pieces reaching the certain temperature range. As noted previously, if the diffusion bonding pressure is applied either before the pieces reach the certain temperature range or is applied when the pieces are heated to a temperature above the certain temperature range, either one of the dissimilar ceramic pieces will crack if their expansion percentages are different at the temperature where the diffusion bonding pressure is applied. The ceramic piece placed in tension by its bonded associated ceramic piece will crack. The next step in the process shown in FIG. 1 after the diffusion bonding pressure is applied to the ceramic pieces heated to the certain temperature range, continues as shown in block 18 to remove the diffusion bonding pressure while the bonded ceramic pieces are being cooled to ambient temperature. The step of removing the pressure as shown in block 18 can be performed either before, after, or during the time the ceramic pieces are being cooled to ambient temperature.

Figure 2:
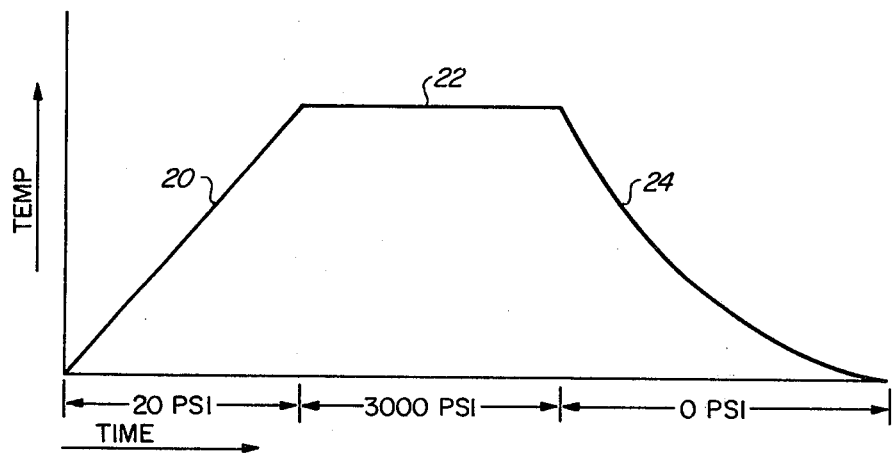
FIG. 2 is a graph of temperature, time and pressure used in the process of FIG. 1.

FIG. 2 shows a graph of the temperature versus time and the representative pressure applied over the temperature versus time. During the time represented by the line 20, the temperature of the ceramic pieces as shown in the process of FIG. 1 is increasing. During this time period a representative pressure of 20 pounds per square inch (psi) is being applied to the pieces. This pressure is just sufficient to hold the pieces adjacent each other and to ensure their correct alignment. The pressure is insufficient to affect any diffusion bonding.

When the temperature reaches the point identified by the line 22, the temperature is held constant for a period of time. The temperature identified by the line 22 is the certain temperature identified previously. This temperature is different for different ceramic materials and is generally identified by the linear thermal expansion percentage curves either experimentally obtained for ceramic materials, or obtained from the manufacturers of the ceramic materials. As shown in FIG. 2 and described in the process of FIG. 1, at this time a diffusion bonding pressure is applied to these pieces. A representative pressure is shown in FIG. 2 of 3000 psi. The diffusion bonding process is well known in the ceramic bonding art and the figures given are merely representative of the differences during the process of the invention according to FIG. 1. As shown in FIG. 2, this certain temperature is held with the applied pressure for a period of time to effect the diffusion bond. After the diffusion bonding is completed, the temperature is allowed to return to ambient as identified by the curve 24. The pressure may be immediately removed as shown in FIG. 2 or the pressure may be gradually removed while the temperature is decreasing, or the pressure might be removed after the temperature reaches ambient. The relieving of the pressure as the temperature is decreased to ambient is not critical.

Figure 3:
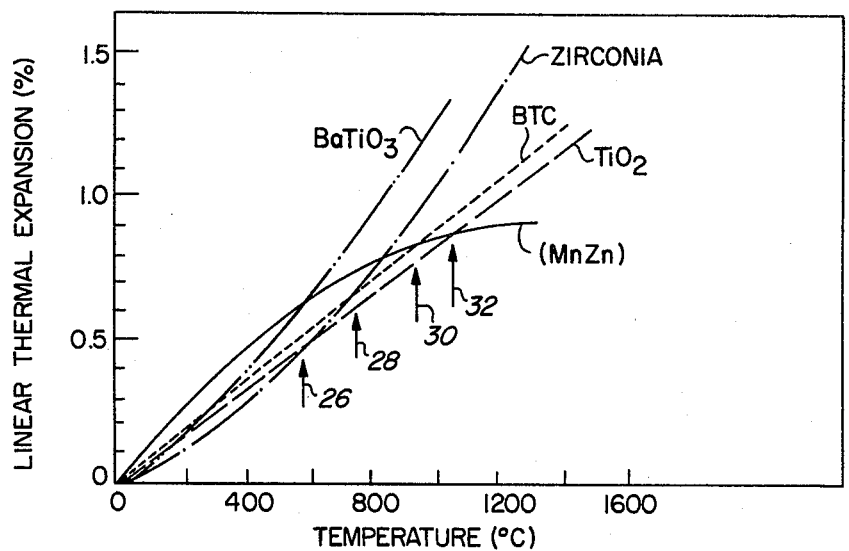
FIG. 3 is a graph showing the percentage of linear thermal expansion rate of a magnetic ferrite and different ceramics at various temperature ranges.

FIG. 3 shows a graph of the linear thermal expansion percentage of various ceramics versus the temperature in centigrade degrees. The graph can be used to find the certain temperature points where a crack-free diffusion bond can be accomplished according to the present invention. The curves on the graph were determined empirically and are sufficient to disclose to someone skilled in the art the process according to the present invention. The curve labeled MnZn is a magnetic ferrite formed of manganese-zinc. The other four curves depict non-magnetic ceramics which could be bonded to this magnetic ferrite. The manganese-zinc ferrite according to this curve, has the chemistry in mole percentage of $Fe_2O_3$ of 54%, a MnO of 38% and a ZnO of 8%. The non-magnetic ceramic titania is identified by the chemical term $TiO_2$. The curve identified by the term zirconia is formed of the chemical formula $ZrO_2$. The dotted line curve identified as BTC is a barium titanate ceramic having the following chemistry in weight percentage; BaO of 20.8%, $TiO_2$ of 78.1%, $ZrO_2$ of 0.8% and $SiO_2$ of 0.3%. The composition is a two-phase material of $TiO_2$ and $Ba_2Ti_9O_{20}$ as a chemical formulation. The curve identified by the chemical term $BaTiO_3$ is a barium titanate having a single phase. In some cases for the curves shown in FIG. 3, the data is an extrapolation of the curves and is as accurate as can be obtained from the data, but again is sufficiently accurate for the purpose of this invention.

In order to bond the manganese-zinc magnetic ferrite to one of the non-magnetic ceramics shown in FIG. 3, the diffusion bonding must be done at the temperature where the manganese-zinc thermal expansion line crosses the representative non-magnetic ceramic line. For instance, the arrow identified by the reference numeral 26 points to the crossover point between the barium titanate and the manganese-zinc ferrite. The temperature at this point is approximately 550° centigrade. Thus the diffusion bonding of these two ceramics for a crack-free bond should occur at approximately 550° C. Since the diffusion bonding process is time, temperature and pressure dependent, with this low of a temperature the time to obtain a good bond might have to be quite high. In diffusion bonding, no bond will occur if the temperature is too low and too much reaction between the ceramics and the furnace may occur if the temperature is too high. According to the present invention, however, a crack-free diffusion bond can be obtained between a manganese-zinc ferrite and a barium titanate at the certain temperature of 550° C. as identified by the arrow 26.

The same manganese-zinc ferrite can be bonded to zirconia ceramic at approximately 800° C. as shown by the arrow identified by the reference numeral 28. At this point, the two curves cross and thus the process of FIG. 1 has a certain temperature range of approximately 800° C. Likewise for the barium titanate ceramic identified by the dashed lines marked BTC, the certain temperature is pointed out by arrow 30 as being approximately 900° C. Thus the certain temperature between the manganese-zinc ferrite of FIG. 3 and BTC is approximately 900° C. Also identified in FIG. 3 is the point identified by arrow 32 which points out the crossover point between titania ceramic and manganese-zinc ferrite to identify the certain temperature for diffusion bonding these two ceramics of approximately 1000° C. Thus as identified in FIG. 3, the crossover point of the thermal expansion curves for different ceramics can identify the certain temperature range at which these two dissimilar ceramics can be diffusion bonded together to form a crack-free bond.

For the bonding of the manganese-zinc ferrite to the BTC identified ceramic, a good bond was accomplished at 900° C. with a pressure of 3000 psi for a one-hour time. A good crack-free bond was obtained. The same ceramics were diffusion bonded at the same 900° C. with a 1500 psi for a time period of one and one-half hours to again obtain a good bond without cracks. The ideal temperature range for obtaining a good diffusion bond between ceramics appears to be in the 800° C. to 1000° C. range. According to the experiments performed, the critical temperature ranges identified can fall within a ±25° C. temperature range and still obtain a good crack-free bond. The preferred exact temperature can be obtained through experimentation using the details of the present invention since the linear thermal expansion curves are empirically gathered and may have a 10% to 15% error in the drawing of the curves. The curves are also dependent on the porosity of the ceramics and other factors.

Figure 4:
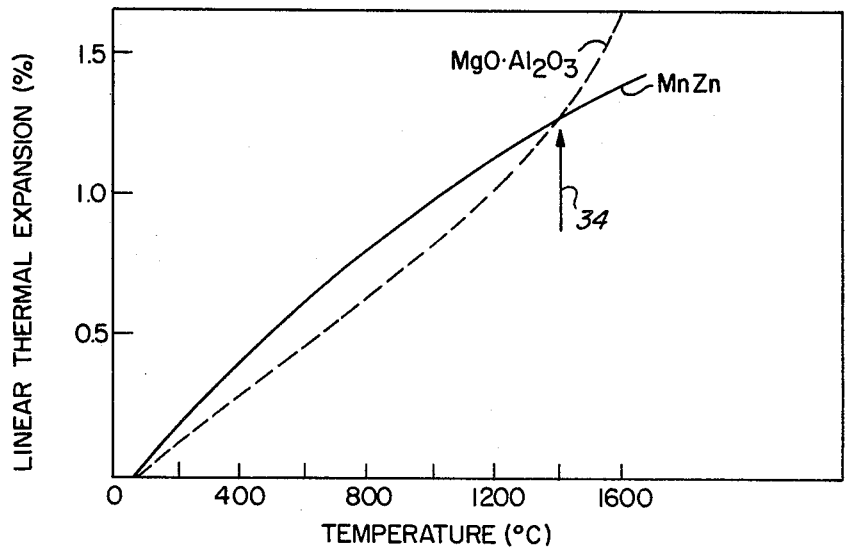
FIG. 4 is a graph similar to FIG. 3 showing the thermal expansion rates of a different magnetic ferrite and a ceramic.

FIG. 4 shows the linear thermal expansion curve versus temperature for a different manganese-zinc ferrite and a spinel non-magnetic ceramic of magnesium aluminate identified by the chemical term $MgO.Al_2O_3$. The certain temperature range for these two ceramics is identified by the arrow 34 which is approximately 1350° C. The spinel bonds crack-free using diffusion bonding in the range of 1350° C. The manganese-zinc ferrite in FIG. 4 has a mole percentage of 53%-$Fe_2O_3$, 29%-MnO and 18%-ZnO. The spinel diffusion bonds crack-free using about a 3000 psi of pressure for approximately one hour.

Figure 5:
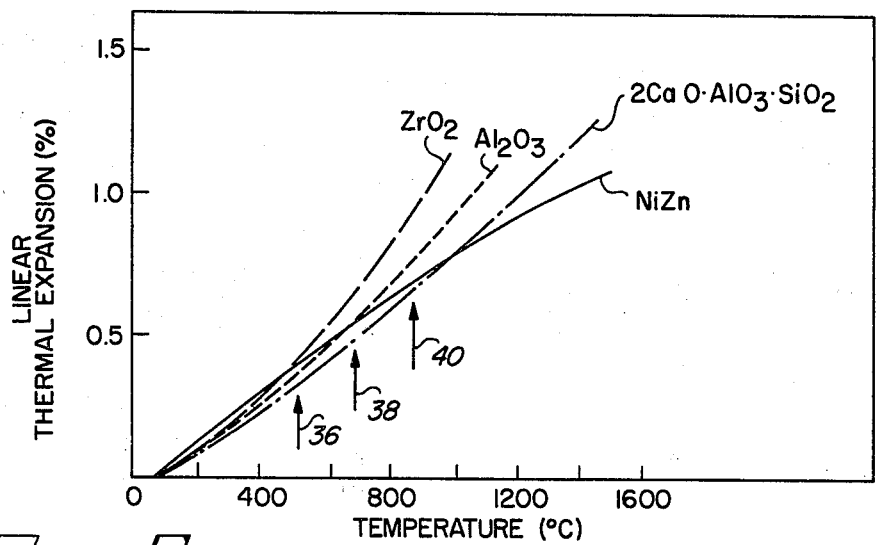
FIG. 5 is a graph similar to FIGS. 3 and 4 showing the thermal expansion rates of a different magnetic ferrite and various ceramics.

FIG. 5 shows a graph of a nickel-zinc ferrite and other non-magnetic ceramics with the thermal expansion percentage curves to identify the certain temperature ranges needed to diffusion bond these dissimilar ceramics according to the present invention. Thus the certain temperature range for bonding the nickel-zinc ferrite to a zirconia ceramic is approximately 500° C. as identified by the arrow 36. The certain temperature range for the nickel-zinc ferrite with the alumina ceramic is identified by the arrow 38 in the approximate 650° C. temperature range. THe diffusion bonding of the non-magnetic ceramic having the chemical formula $2CaO.Al_2O_3.SiO_2$ to the nickel-zinc has a certain temperature range of approximately 850° C. as identified by an arrow 40. As stated previously, the higher that the temperature can be put at for the diffusion bonding process, the lower the time and the pressure required to accomplish the bond. Thus a higher pressure and a longer period of time is required to bond the nickel-zinc ferrite to the zirconia ceramic than the calcium ceramic which has a higher certain temperature. For the present invention, the diffusion bonding process temperature is limited to a range of the certain temperature ± approximately 25° C. with the pressure and time changed to accommodate the temperature for a good diffusion bond.

As an example, the manganese-zinc ferrite of FIG. 3 included the following process steps and process ranges for bonding with the non-magnetic ceramic BTC also shown in FIG. 3. A polished surface of the BTC ceramic was placed adjacent to a polished surface of the manganese-zinc ferrite. The sample sizes were one-half inch square and one-eighth inch thick, although the sample size is not critical. The samples were placed within a silicon-carbon mold and were surrounded with a 20 grit alumina sand. The mold was then placed within a furnace. A minimum pressure to compact the alumina sand around the samples was applied in the range of 20 psi to 200 psi. The temperature was increased 20° C. per minute with a temperature range of ±10° C. per minute. The temperature was increased until the temperature of 900° C.±25° C. was reached. The nitrogen atmosphere was maintained in the furnace. An oxygen partial pressure of less than 100 parts per million was maintained. After the temperature reached approximately the certain temperature of 900° C., a pressure of 3000 psi ±500 psi was applied to the ceramic pieces. The temperature in the pressure was held for one hour ±15 minutes. The pressure was then released in the furnace and the bonded ceramic piece was permitted to cool to ambient temperature. It has been found that crack-free bonds also occurred if the pressure is applied until the parts attain the ambient temperature. The furnace cool rate was approximately 7° C. per minute. The cooling rate can be as rapid as desired yet should not be of such a degree to thermally heat shock the samples. The samples were then removed from the mold and a good crack-free diffusion bond was observed.

The same steps were taken as for example 1 to bond a non-magnetic zirconia ceramic to the manganese-zinc ferrite of FIG. 3. The certain temperature range was 800° C.±25° C. The temperature and time profile was the same as for example 1 and a crack-free diffusion bond was obtained between the zirconia ceramic and the manganese-zinc ferrite.

Figure 6:
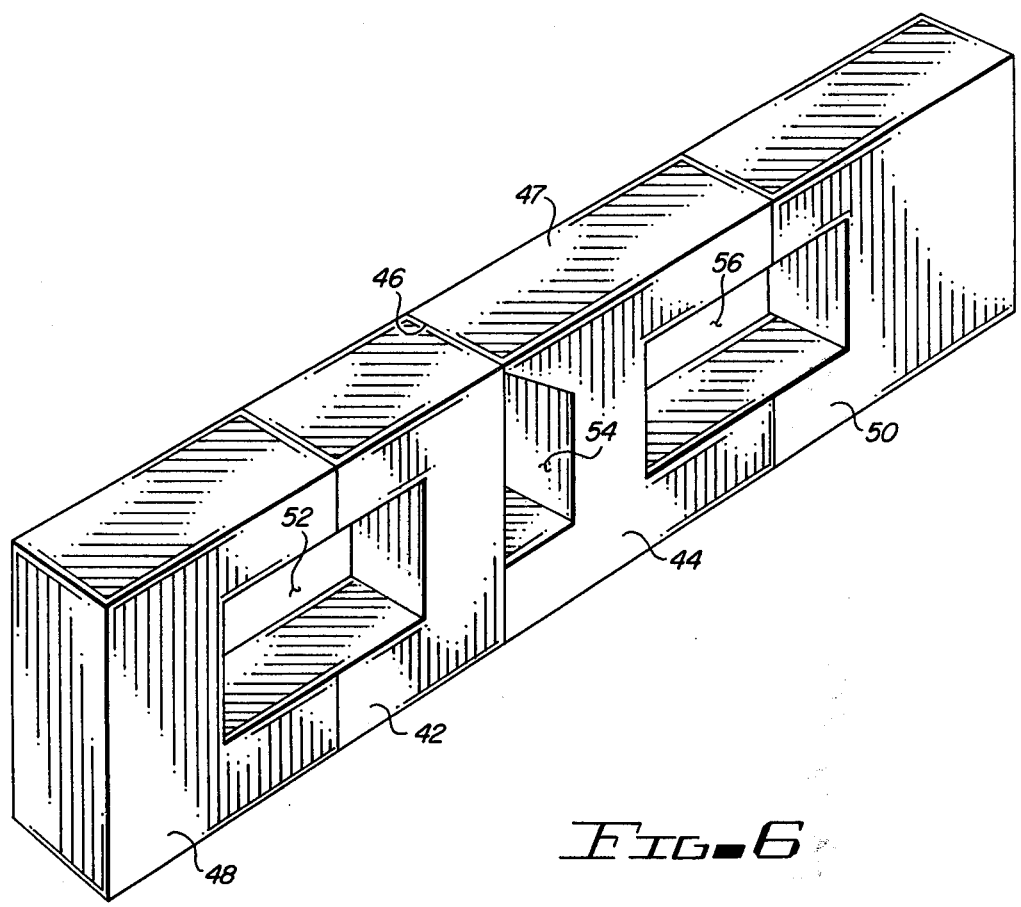
FIG. 6 is a perspective view of a magnetic head core made according to the bonding steps of the present invention.

The preferred usage of the process according to the present invention is to fasten blocks of magnetic and non-magnetic ceramics together as part of a magnetic transducing core for a magnetic head. FIG. 6 shows a head core for use in a magnetic head. The head core of FIG. 6 includes two magnetic ferrite blocks 42 and 44 which form a transducing gap 46 at the air-bearing surface 47 of the head core. Non-magnetic ceramic blocks 48 and 50 are diffusion bonded using the process of the present invention to the edges of the ferrite pieces 42 and 44 respectively. The head core includes apertures 52, 54 and 56. An electrical coil (not shown) is wound about the ferrite piece 42 or 44 through the apertures 52 and 54, or through the apertures 54 and 56 after a sandwich-type head assembly encompassing the head core are bonded together. Generally to make the head core, ferrite block 44 and ceramic block 50 are first bonded together. Likewise, the ferrite block 42 is bonded to the ceramic block 48. The diffusion bonding process of the present invention is used in these bonding processes because of the dissimilar ceramic blocks used for the magnetic and non-magnetic ceramics. After the magnetic ferrite and the non-magnetic ceramic pieces are diffusion bonded, the magnetic ferrite pieces 42 and 44 are bonded together to form the transducing gap 46. Generally glass is used as the bonding material to form the transducing gap 46. The glass bonding process together with the winding of the electrical coil is performed in a well-known manner and need not be further described herein. The bonding of the magnetic ferrite blocks to the non-magnetic ceramic blocks according to the present invention is shown in FIG. 7.

Figure 7:
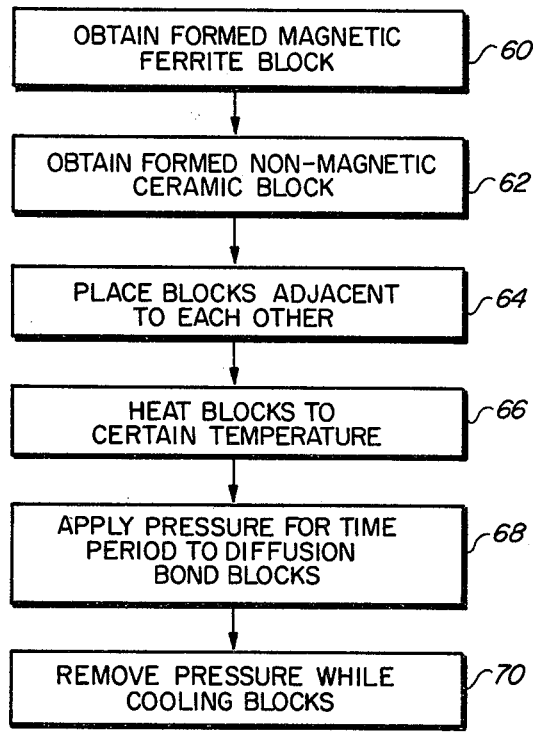
FIG. 7 is a flow chart of the processing steps for making the head core of FIG. 6.

Referring now to FIG. 7, the first step in the bonding procedure towards the making of the head core is to obtain a formed magnetic ferrite block as shown in box 60. This procedure can be performed by obtaining either ferrite block 42 or 44 as previously formed to include their portion of apertures 52, 54 and 56. The next step in the process of FIG. 7 is to obtain a formed non-magnetic ceramic block as shown in box 62. This process entails obtaining the blocks 48 or 50 as required to bond to its associated ferrite block 42 or 44, respectively. The next step in the process as shown in box 64 is to place the formed magnetic ferrite block and the formed non-magnetic ceramic block adjacent each other. This entails placing either the ferrite block 44 adjacent to the ceramic block 50 or the ferrite block 42 adjacent to the ceramic block 48. The blocks are placed such that the apertures 52 or 56 are formed at the contact point.

Continuing with FIG. 7, the next step in the process as shown in box 66 is to heat the blocks that were placed adjacent each other to the certain temperature range. The preferred material used for the magnetic ferrite is the manganese-zinc ferrite and the non-magnetic ceramic block is a BTC ceramic, the curves for both of which are shown in FIG. 3. In FIG. 3, the arrow 30 points to the intersection of the two thermal expansion curves. Thus as shown in FIG. 3, the certain temperature is approximately 900° C. Continuing with the process steps of FIG. 7, a pressure is applied for a time period as shown in box 68 to diffusion bond the heated blocks. As identified in the temperature versus time curve of FIG. 2, the line on the curve identified by the reference numeral 22 represents this time period. The temperature is held constant while a pressure is applied for a period of time. Using the preferred materials, the pressure applied by this step is 3000 psi and the time period is for one hour. The process according to FIG. 7 continues to box 70 where the applied pressure is removed while the blocks are cooled to an ambient temperature as identified in the graph of FIG. 2 by the curve 24. The parts of the head core formed according to the process of FIG. 7 showed a good bond without cracking in either of the ceramic blocks.

The principles of the present invention have now been made clear in an illustrative embodiment. There will be immediately obvious to those skilled in the art many modifications of the structure, arrangement, proportions, the elements, materials and components used in the practice of the invention. For instance, different types of ceramics can be bonded together other than the magnetic ferrite and non-magnetic ceramics shown in the examples of FIGS. 3-5. Two non-magnetic ceramics may be diffusion bonded together using the process steps of FIG. 1 and the determination of the certain temperature range using the thermal expansion curves of the ceramics. Likewise, a person skilled in the diffusion bonding art can determine different pressure and time ranges than that given in the examples in order to accomplish a crack-free diffusion bond according to the present invention. The criticality for a crack-free diffusion bond of dissimilar ceramics and that process step taught by the present invention is in the certain temperature range found according to the disclosure in the present invention. The appended claims are, therefore, intended to cover and embrace any such modification within the limits only of the true spirit and scope of the invention.

What is claimed is:

1. A process for diffusion bonding of ceramic pieces respectively consisting of dissimilar ceramic materials having expansion curves with a certain temperature range where the respective thermal expansion curves of each ceramic material intersect, said process comprising the steps of:
   obtaining the ceramic pieces;
   placing the obtained ceramic pieces adjacent each other for bonding;
   heating the placed ceramic pieces to the certain temperature range;
   applying pressure to the heated ceramic pieces to effect a diffusion bond while maintaining the ceramic pieces at the certain temperature range;
   removing the applied pressure; and
   cooling the bonded ceramic pieces to ambient temperature.

2. A process for diffusion bonding as defined in claim 1 wherein the step of removing the applied pressure is performed before the step of cooling.

3. A process for diffusion bonding as defined in claim 1 wherein the step of removing the applied pressure is performed after the step of cooling.

4. A process for diffusion bonding as defined in claim 1 wherein one of said ceramic pieces consists of a non-magnetic ceramic material and a second of said ceramic pieces consists of a magnetic ferrite material.

5. A process for diffusion bonding ceramic pieces as defined in claim 4 wherein the magnetic ferrite material is manganese-zinc and the non-magnetic ceramic material is taken from the class consisting of magnesium aluminate, zirconia, titania, and barium titanate.

6. A process for bonding ceramic pieces as defined in claim 5 wherein the bonded ceramic pieces are further bonded to other ceramic pieces to form a magnetic head structure.

7. A process for diffusion bonding of ceramic pieces as defined in claim 5 wherein the magnetic ferrite material is manganese-zinc and the non-magnetic ceramic material is titania and the certain temperature range is approximately 1000 degrees centigrade.

8. A process for diffusion bonding of ceramic pieces as defined in claim 5 wherein the magnetic ferrite material is manganese-zinc and the non-magnetic ceramic material is zirconia and the ceramic materials are heated to the certain temperature range of approximately 800 degrees centigrade.

9. A process for diffusion bonding of ceramic pieces as defined in claim 5 wherein the magnetic ferrite material is manganese-zinc and the non-magnetic ceramic material is magnesium aluminate and wherein the ceramic pieces are heated to the certain temperature range of approximately 1400 degrees centigrade.

10. A process for making parts of a head core for a magnetic head by the diffusion bonding of a formed magnetic ceramic block to a formed non-magnetic ceramic block with the dissimilar ceramic materials having expansion curves with a certain temperature range where the respective thermal expansion curves of each ceramic material intersect, said process comprising the steps of:
    obtaining the formed magnetic ceramic block;
    obtaining the formed non-magnetic ceramic block;
    placing the obtained ceramic blocks adjacent each other in the bonding configuration;
    heating the placed ceramic blocks to the certain temperature range;
    applying pressure for a time period to the heated ceramic blocks to effect a diffusion bond while maintaining the ceramic pieces at the certain temperature range; and
    removing the applied pressure while cooling the bonded ceramic pieces to ambient temperature.

11. A process for diffusion bonding dissimilar ceramic blocks to form a part of a head core as defined in claim 10 wherein the magnetic ceramic piece is manganese-zinc ferrite and the non-magnetic ceramic block is a barium titanate ceramic.

12. A process for diffusion bonding of dissimilar ceramic blocks to form a head core as defined in claim 11 wherein the certain temperature range is approximately 900° C. and the pressure applied is 3000 psi for a time period of one hour.

* * * * *